US012764455B2

(12) United States Patent
Lu et al.

(10) Patent No.: US 12,764,455 B2
(45) Date of Patent: Oct. 13, 2026

(54) SPEAKER BACK COVER AND SPEAKER

(71) Applicant: BENQ CORPORATION, Taipei City (TW)

(72) Inventors: Tung-Ko Lu, Taoyuan City (TW); Chih-Hung Lin, Taoyuan City (TW)

(73) Assignee: BENQ CORPORATION, Taipei City (TW)

( * ) Notice: Subject to any disclaimer, the term of this patent is extended or adjusted under 35 U.S.C. 154(b) by 101 days.

(21) Appl. No.: 19/055,518

(22) Filed: Feb. 18, 2025

(65) Prior Publication Data

US 2026/0082148 A1 Mar. 19, 2026

(30) Foreign Application Priority Data

Sep. 18, 2024 (TW) ................................ 113135188

(51) Int. Cl.
*H04R 1/28* (2006.01)
*H04R 1/02* (2006.01)

(52) U.S. Cl.
CPC .......... *H04R 1/2811* (2013.01); *H04R 1/025* (2013.01); *H04R 2400/11* (2013.01)

(58) Field of Classification Search
CPC .... H04R 1/2811; H04R 1/025; H04R 2400/11
See application file for complete search history.

(56) References Cited

U.S. PATENT DOCUMENTS 6,062,339 A * 5/2000 Hathaway ............ H04R 1/2826 181/160

FOREIGN PATENT DOCUMENTS

| | | |
|---|---|---|
| CN | 106375899 | 2/2017 |
| CN | 111225307 | 6/2020 |
| CN | 219227790 | 6/2023 |
| TW | M570572 U * | 11/2018 |

* cited by examiner

*Primary Examiner* — Sinh Tran
(74) *Attorney, Agent, or Firm* — Winston Hsu

(57) ABSTRACT

A speaker includes a speaker driver and a speaker back cover. The speaker driver has a basket at its rear side. The speaker back cover is sealed and fixed to the basket and includes two casing parts which are relatively movably or rotatably connected and form a resonance space at the rear side of the speaker driver. Each casing part has a channel structure with an opening. The two channel structures are connected so that the resonance space is connected to the outside of the speaker back cover through it. The two casing parts can be moved or rotated relative to each other to adjust a channel path length of the two channel structures from their inner opening to their outer opening.

18 Claims, 7 Drawing Sheets

SPEAKER BACK COVER AND SPEAKER

BACKGROUND OF THE INVENTION

1. Field of the Invention

The present invention relates to a speaker, and more particularly to a speaker with a back cover.

2. Description of the Prior Art

The structural configurations of common speakers are fixed, and in principle, they can only provide fixed sound quality, which limits the application of the speakers. If the sound quality needs to be changed, it is practicable to replace the speaker back cover or modify the structure thereof, e.g., by adding absorbing foam to modify the volume of the speaker back cover, etc., which is also very inconvenient.

SUMMARY OF THE INVENTION

In view of the problems in the prior art, an objective of the invention is to provide a speaker back cover, used to be assembled to a basket on a rear side of a speaker driver. The speaker back cover provides a resonance space and has a mechanism to adjust a channel path length from the resonance space to the outside, so as to adjust the sound quality.

A speaker back cover of an embodiment according to the invention is used to be assembled to a basket on a rear side of a speaker driver. The speaker back cover includes a first casing part and a second casing part. The first casing part has a first channel structure. The first channel structure has an inner opening. The second casing part has a second channel structure. The second channel structure has an outer opening. The first casing part and the second casing part are relatively movably connected and form a resonance space. The inner opening is exposed in the resonance space. The outer opening is exposed on the speaker back cover. The first channel structure and the second channel structure are connected so that the resonance space communicates with an outside of the speaker back cover through the inner opening and the outer opening. Therein, the first casing part and the second casing part are moved or rotated relative to each other to adjust a channel path length from the inner opening to the outer opening. Thereby, the speaker back cover uses the first casing part and the second casing part that can move or rotate relative to each other as an adjustment mechanism. A user can adjust the sound quality by operating the first casing part or the second casing part, which is simple and convenient.

Another objective of the invention is to provide a speaker, which includes a speaker driver and the speaker back cover mentioned above. The speaker back cover is sealed and fixed to the basket, so that the resonance space at the rear side of the speaker driver. Thereby, the speaker is equipped with the adjustment mechanism (formed by the first casing part and the second casing part that can move or rotate relative to each other) provided by the speaker back cover, a user can adjust the sound quality by operating the first casing part or the second casing part of the speaker back cover, which is simple and convenient.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
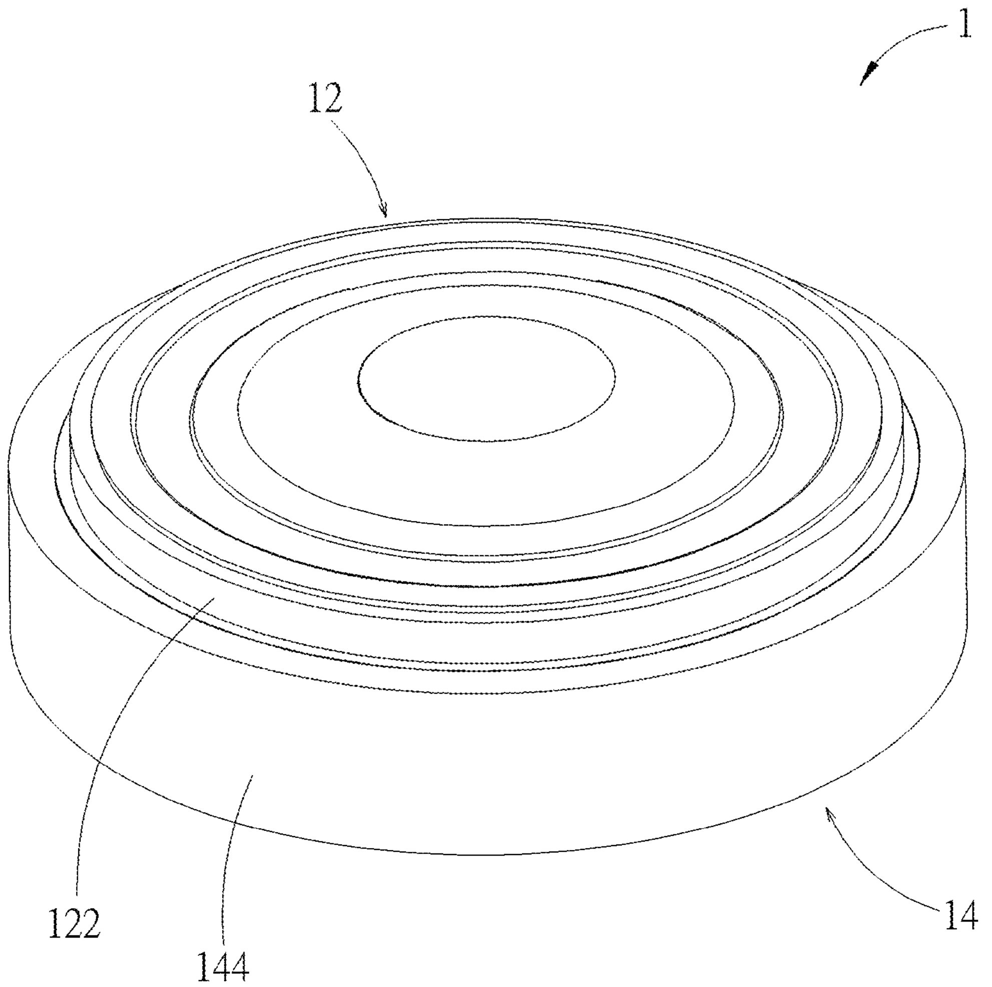
FIG. 1 is a schematic diagram illustrating a speaker according to an embodiment.

Please refer to FIG. 1 to FIG. 5. A speaker 1 according to an embodiment includes a speaker driver 12 and a speaker back cover 14. The speaker driver 12 has a basket 122 at its rear side. The speaker back cover 14 is assembled to the basket 122. Therein, the speaker back cover 14 includes a first casing part 142 and a second casing part 144. The first casing part 142 and the second casing part 144 are relatively movably connected and form a resonance space 140. The speaker back cover 14 is sealed and fixed to the basket 122, so that the resonance space 140 is located at the rear side of the speaker driver 12. The first casing part 142 has a first channel structure 1422. The first channel structure 1422 has an inner opening 1422*a*. The inner opening 1422*a* is exposed in the resonance space 140. The second casing part 144 has a second channel structure 1442. The second channel structure 1442 has an outer opening 1442*a*. The outer opening 1442*a* is exposed on the speaker back cover 14. The first channel structure 1422 and the second channel structure 1442 are connected so that the resonance space 140 communicates with an outside of the speaker back cover 14 (or the speaker 1) through the inner opening 1422*a*, the first channel structure 1422, the second channel structure 1442, and the outer opening 1442*a*. In other words, the first channel structure 1422 and the second channel structure 1442 form a channel structure of the speaker back cover 14. Through the mutual movable structural relationship between the first casing part 142 and the second casing part 144, this channel structure is adjustable. Therefore, the first casing part 142 and the second casing part 144 can be operated (e.g., a user) to move or rotate relative to each other to adjust a channel path length from the inner opening 1422*a* to the outer opening 1442*a*, thereby producing the effect of adjusting the sound quality of the speaker 1.

Figure 4:
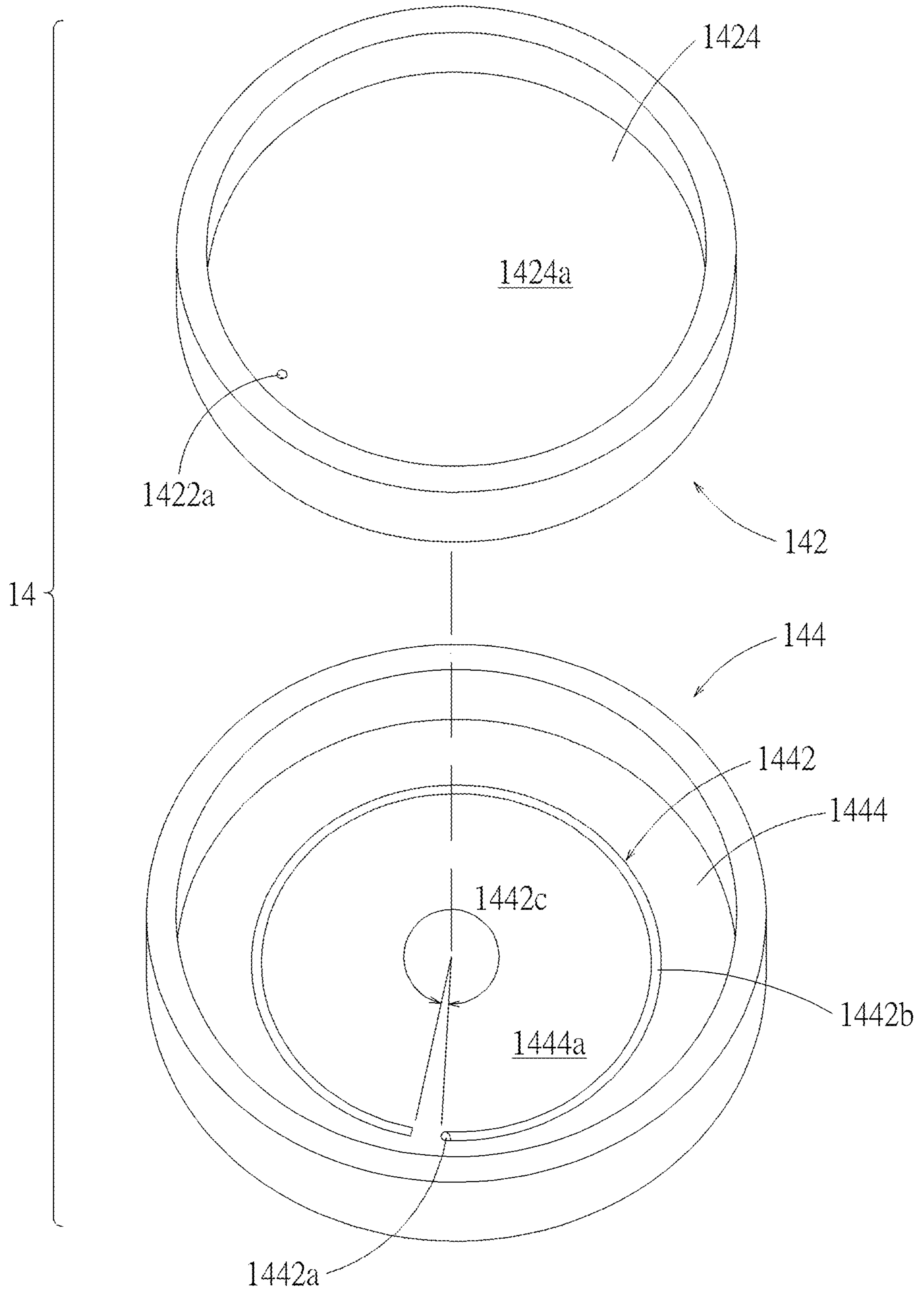
FIG. 4 is an exploded view of a speaker back cover of the speaker in FIG. 3.
Figure 5:
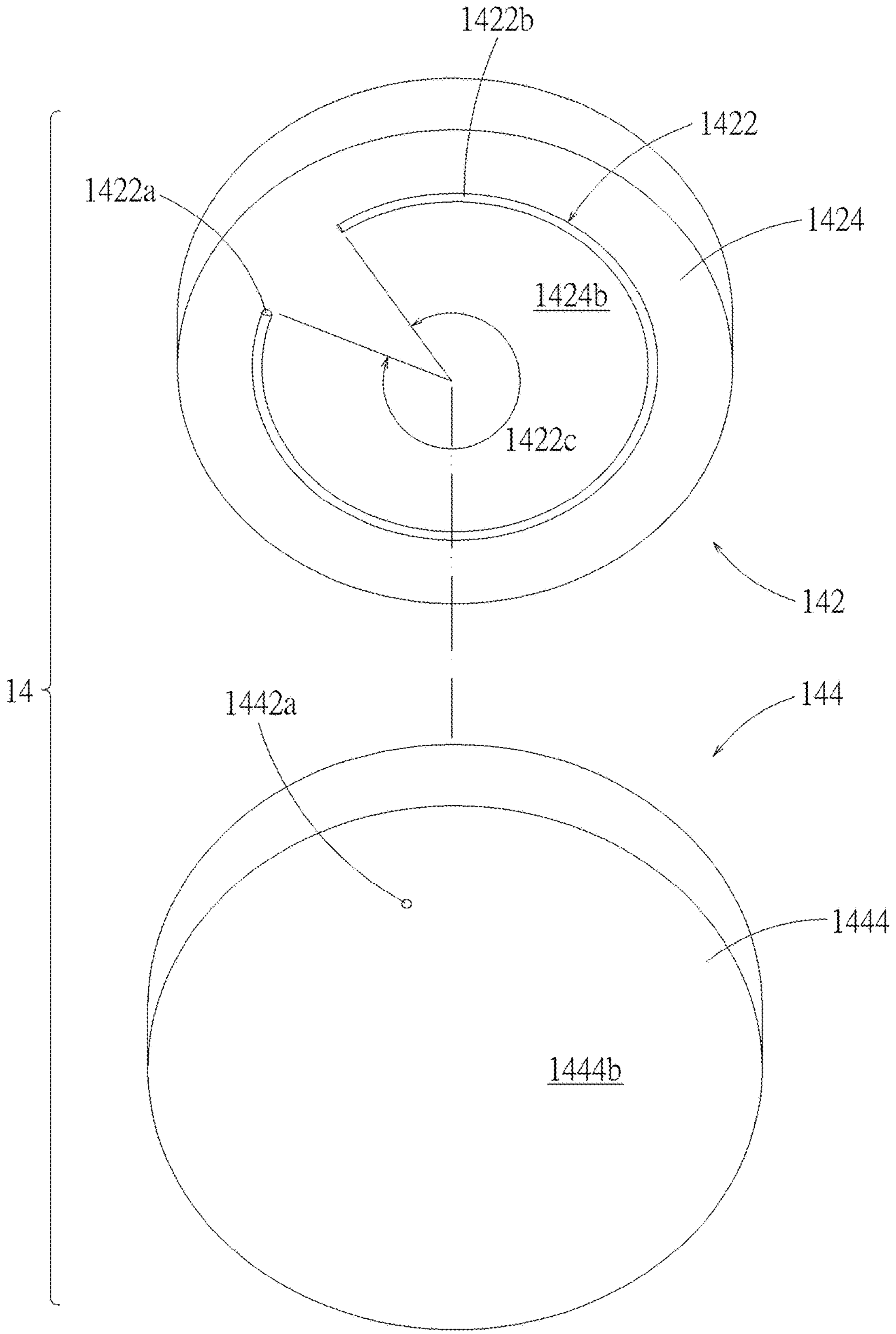
FIG. 5 is another exploded view of the speaker back cover in FIG. 4 in another viewpoint.

As shown by FIG. 4 and FIG. 5, furthermore, in the embodiment, the first casing part 142 is an inner cylindrical container, and the second casing part 144 is an outer cylindrical container. The first casing part 142 and the second casing part 144 are stacked together, and the first casing part 142 is inside the second casing part 144. The first casing part 142 forms the resonance space 140. The first casing part 142 is sealed and fixed to the basket 122 (referring to FIG. 2). The second casing part 144 is rotatable relative to the first casing part 142 around a rotation axis 14*a*

(indicated by a chain line in the figures) relative to the first casing part 142. In the first casing part 142, the first channel structure 1422 is formed on a first bottom 1424 of the first casing part 142. Therein, the first bottom 1424 has a first inner surface 1424*a* and a first outer surface 1424*b* opposite to the first inner surface 1424*a*. The first outer surface 1424*b* faces a second bottom 1444 of the second casing part 144. The first channel structure 1422 includes a first groove 1422*b*. The first groove 1422*b* is formed on the first outer surface 1424*b* and is connected to the inner opening 1422*a*. The inner opening 1422*a* passes through the first bottom 1424 to simultaneously connect the first inner surface 1424*a* and the first groove 1422*b*. In the second casing part 144, the second channel structure 1442 is formed on the second bottom 1444 of the second casing part 144. Therein, the second bottom 1444 has a second inner surface 1444*a* and a second outer surface 1444*b* opposite to the second inner surface 1444*a*. The second inner surface 1444*a* faces the first bottom 1424 of the first casing part 142 (or the first outer surface 1424*b*). The second channel structure 1442 includes a second groove 1442*b*. The second groove 1442*b* is formed on the second inner surface 1444*a* and is connected to the outer opening 1442*a*. The outer opening 1442*a* passes through the second bottom 1444 to simultaneously connect the second groove 1442*b* and the second outer surface 1444*b*.

Therefore, the first outer surface 1424*b* faces the second inner surface 1444*a*. The first groove 1422*b* and the second groove 1442*b* are located between the first bottom 1424 and the second bottom 1444. The inner opening 1422*a* is exposed on the first inner surface 1424*a*. The outer opening 1442*a* is exposed on the second outer surface 1444*b*. The first groove 1422*b* and the second groove 1442*b* overlap in a direction parallel to the rotation axis 14*a*. In other words, the first groove 1422*b* and the second groove 1442*b* are connected, and the first channel structure 1422 and the second channel structure 1442 are connected through the first groove 1422*b* and the second groove 1442*b*. Furthermore, in the embodiment, the inner opening 1422*a* is located at an end of the first groove 1422*b*, and the outer opening 1442*a* is located at an end of the second groove 1442*b*; however, it is not limited thereto.

Figure 6:
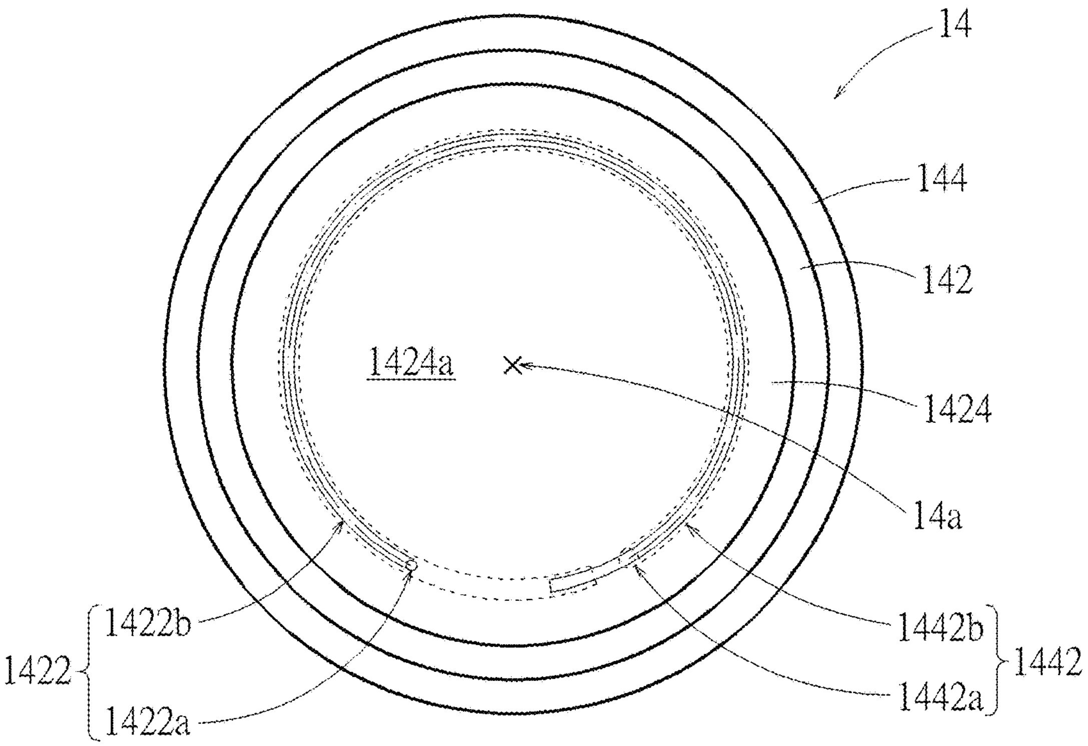
FIG. 6 is a schematic diagram illustrating an adjustable channel structure formed by the speaker back cover.
Figure 7:
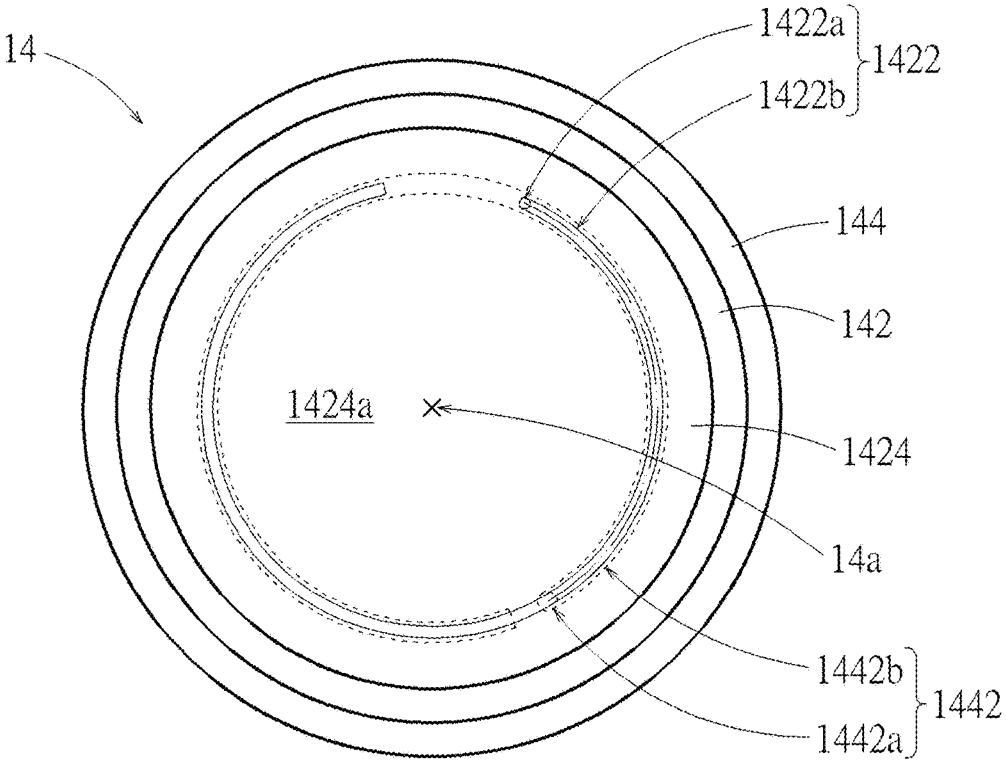
FIG. 7 is a schematic diagram illustrating the channel structure in FIG. 6 after adjusted.

Furthermore, as shown by FIG. 4 and FIG. 4, in the embodiment, the first groove 1422*b* and the second groove 1442*b* both extend around the rotation axis 14*a*, and their extension paths are arc-shaped. Please refer to FIG. 6, which is a top view of the speaker back cover 14 to show the channel structure formed by the first channel structure 1422 and the second channel structure 1442. Therein, in order to conveniently show the relative positions of the first channel structure 1422 and the second channel structure 1442, the outline of the first channel structure 1422 is shown in thin solid lines, the outline of the second channel structure 1442 is shown in dashed lines, the groove width of the second channel structure 1442 is shown enlarged to facilitate identification of the two aforementioned channel structures, and the rotation axis 14*a* is indicated by a cross mark. Moreover, the channel path from the inner opening 1422*a* to the outer opening 1442*a* (i.e., the shortest channel path between the resonance space 140 and the outside of the speaker back cover 14) is indicated by a chain line. The channel path length is approximately the same as the length of the chain line. As shown by FIG. 6, the second casing part 144 can be rotated relative to the first casing part 142 around the rotation axis 14*a* to change the overlapping situation of the first groove 1422*b* and the second groove 1442*b*. For example, (from the viewpoint of FIG. 6) the second casing part 144 is rotated counterclockwise by an angle (as shown by FIG. 7), and the channel path length becomes smaller.

Figure 8:
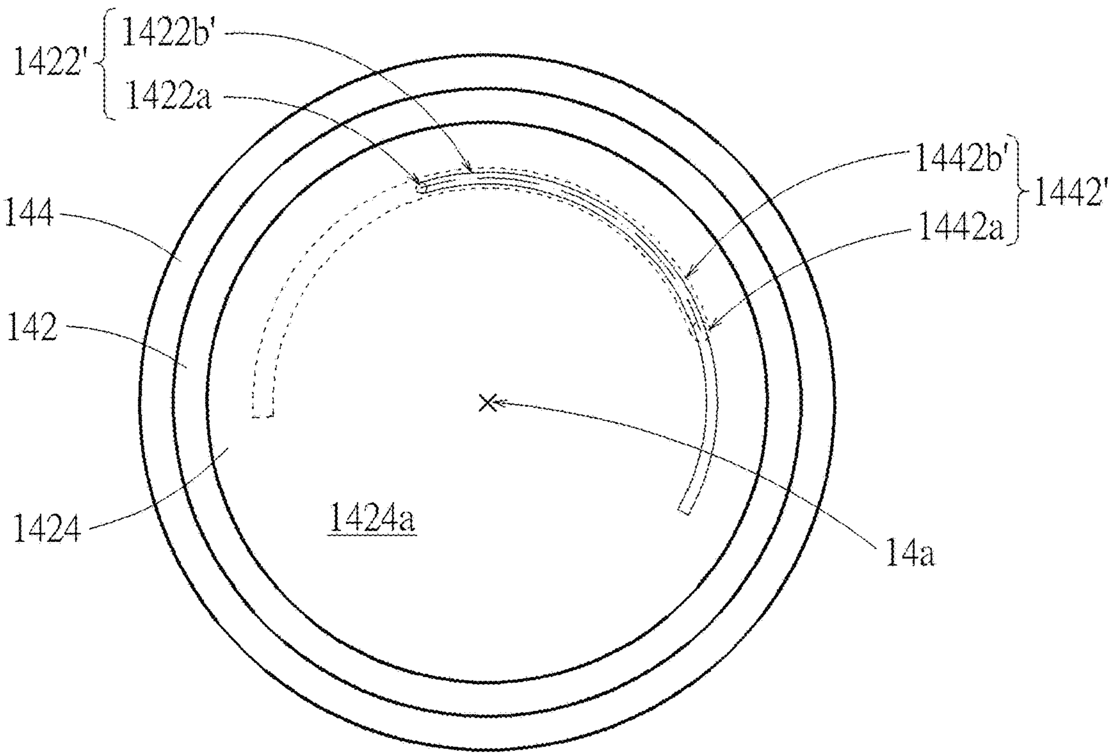
FIG. 8 is a schematic diagram illustrating an adjustable channel structure formed by a speaker back cover according to a variation example.
Figure 9:
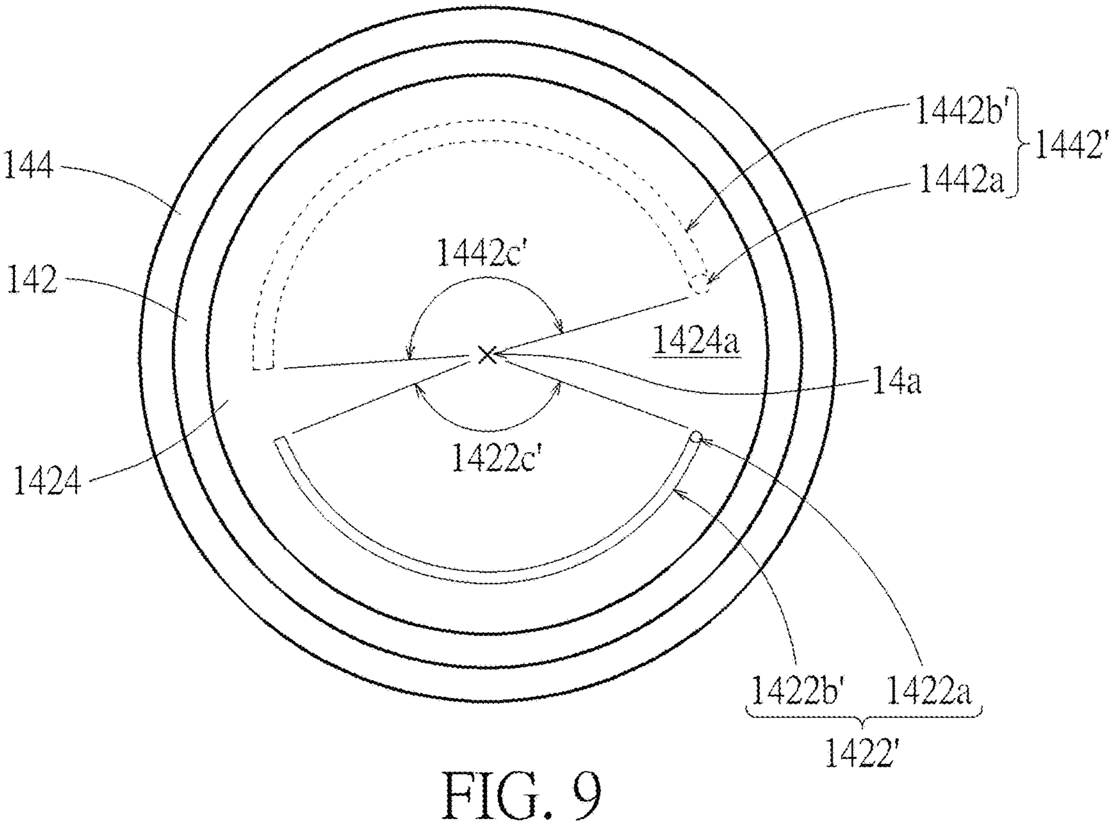
FIG. 9 is a schematic diagram illustrating the channel structure in FIG. 8 after adjusted.

Furthermore, as shown by FIG. 4 and FIG. 5, on the other hand, in the embodiment, the first groove 1422*b* is a first arc-shaped groove extending around the rotation axis 14*a*, and its central angle 1422*c* extending around the rotation axis 14*a* is greater than 180 degrees; the second groove 1442*b* is a second arc-shaped groove extending around the rotation axis 14*a*, and its central angle 1442*c* extending around the rotation axis 14*a* is greater than 180 degrees. The bending radii of the first arc-shaped groove and the second arc-shaped groove are the same. The sum of the central angles 1422*c* and the central angle 1442*c* is greater than 360 degrees, so the first groove 1422*b* and the second groove 1442*b* are necessarily connected. However, it is not limited thereto in practice. For example, if the central angle 1422*c* and the central angle 1442*c* are not both greater than 180 degrees, but the sum of the central angle 1422*c* and the central angle 1442*c* is still greater than 360 degrees, then the first groove 1422*b* and the second groove 1442*b* are still necessarily connected in this case. For another example, as shown by FIG. 8 and FIG. 9, the central angle 1422*c*' of the first groove 1422*b*' and the central angle 1442*c*' of the second groove 1442*b*' are both less than 180 degrees. Therefore, when the second casing part 144 is rotated relative to the first casing part 142 to an angle (as shown by FIG. 9), the first groove 1422*b*' and the second groove 1442*b*' do not overlap; that is, the first channel structure 1422' and the second channel structure 1442' are not connected.

In addition, in the embodiment, the first groove 1422*b* and second groove 1442*b* are both realized by a single arc-shaped groove. However, it is not limited thereto in practice. For example, the first groove 1422*b* and the second groove 1442*b* are formed in other path extension layouts (such as polylines, ellipses, spirals, etc.). For another example, the first groove 1422*b* and the second groove 1442*b* are not limited to a single groove, and may be in a grid shape, for example.

Figure 2:
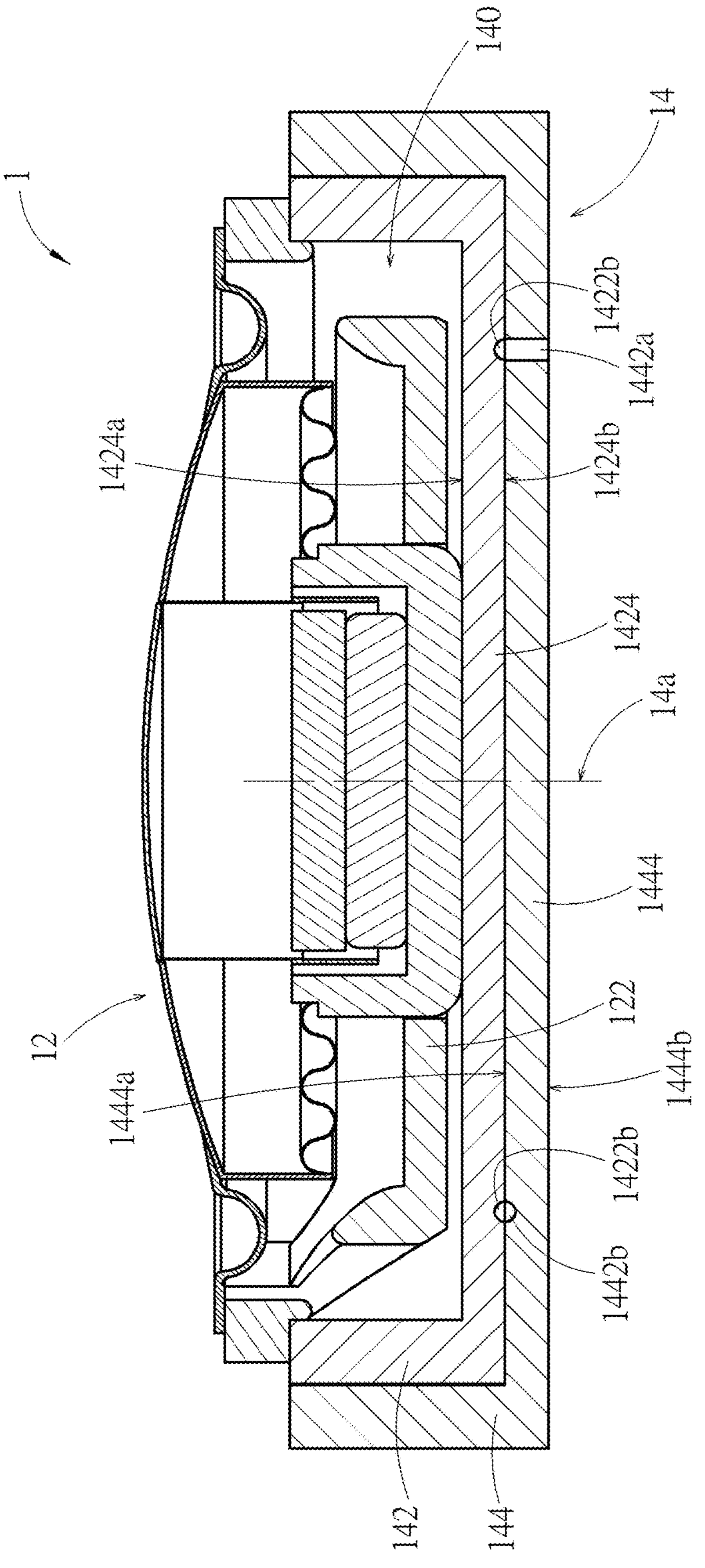
FIG. 2 is a sectional view of the speaker along the line X-X in FIG. 1.
Figure 3:
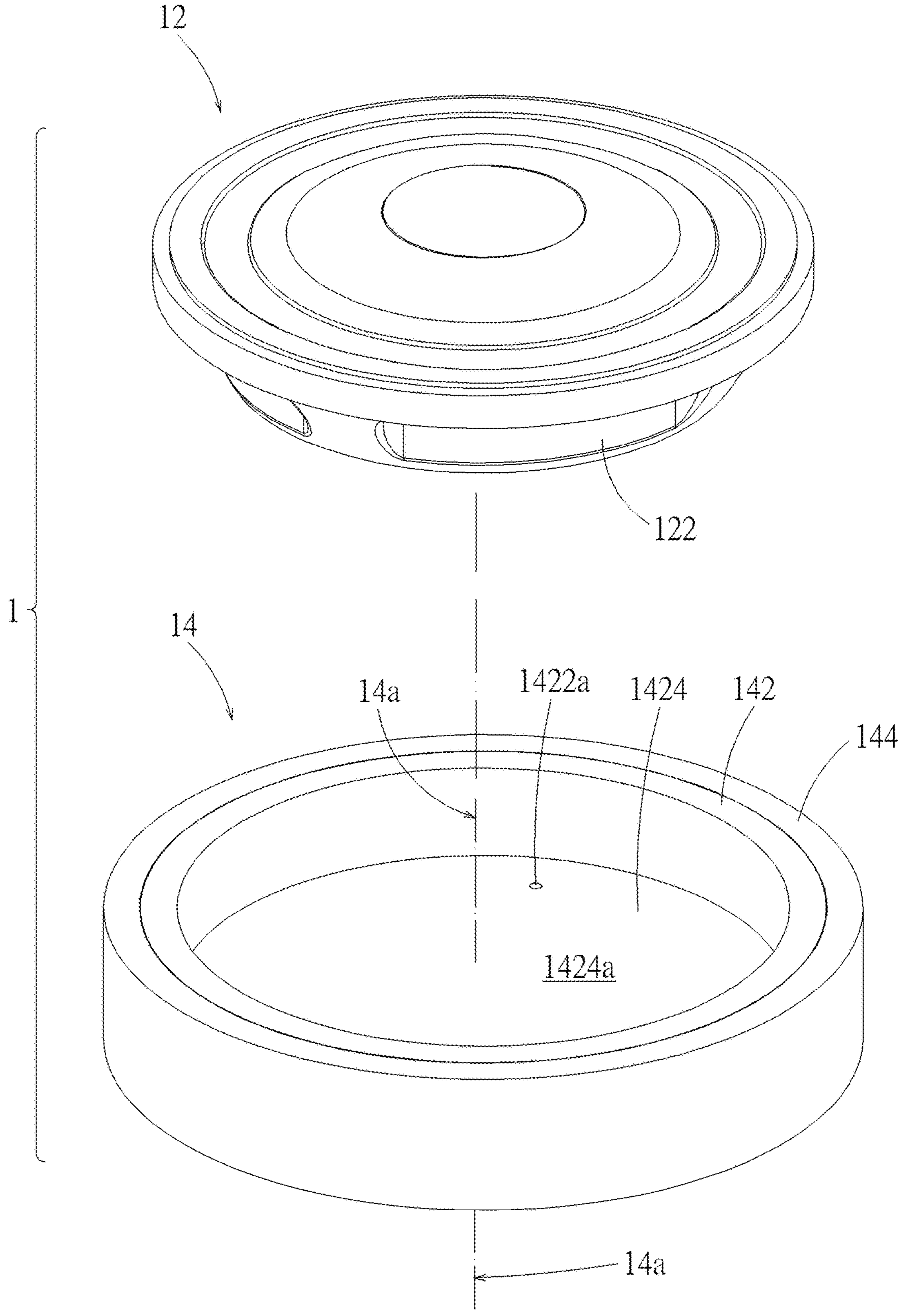
FIG. 3 is a partially-exploded view of the speaker in FIG. 1.

Furthermore, please refer to FIG. 2, FIG. 4 and FIG. 5. In the embodiment, the cross-sectional outlines of the first groove 1422*b* and the second groove 1442*b* are both semi-circle (as shown by FIG. 2), so that the cross-sectional outline of the overlapping portion of the first groove 1422*b* and the second groove 1442*b* (referring to FIG. 6) is circular. However, it is not limited thereto in practice. For example, the cross-sectional outlines of the first groove 1422*b* and the second groove 1442*b* may be semi-elliptical, polygonal or other geometric profiles. For another example, the cross-sectional outlines of the first groove 1422*b* and the second groove 1442*b* are different. For another example, the cross-sectional outlines of the overlapping portions of the first groove 1422*b* and the second groove 1442*b* are not aligned.

In addition, in the embodiment, the channel structure of the speaker back cover 14 includes the first groove 1422*b* and the second groove 1442*b* formed on the first casing part 142 and second casing part 144. However, it is not limited thereto in practice. For example, in the second channel structure 1442, the second groove 1442*b* is omitted, and the outer opening 1442*a* is directly connected to the first groove 1422*b*. Or in the first channel structure 1422, the first groove 1422*b* is omitted, and the inner opening 1422*a* is directly connected to the second groove 1442*b*.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A speaker back cover, used to be assembled to a basket on a rear side of a speaker driver, the speaker back cover comprising:

a first casing part, the first casing part having a first channel structure, the first channel structure having an inner opening; and a second casing part, the second casing part having a second channel structure, the second channel structure having an outer opening, the first casing part and the second casing part being relatively movably connected and forming a resonance space, the inner opening being exposed in the resonance space, the outer opening being exposed on the speaker back cover, the first channel structure and the second channel structure being connected so that the resonance space communicates with an outside of the speaker back cover through the inner opening and the outer opening;

wherein the first casing part and the second casing part are moved or rotated relative to each other to adjust a channel path length from the inner opening to the outer opening.

2. The speaker back cover according to claim 1, wherein the first casing part is an inner cylindrical container, the second casing part is an outer cylindrical container, the first casing part and the second casing part are stacked together, the first casing part is inside the second casing part, the first casing part forms the resonance space, the first channel structure is formed on a first bottom of the first casing part, the second channel structure is formed on a second bottom of the second casing part, and the second casing part is rotatable around a rotation axis relative to the first casing part.

3. The speaker back cover according to claim 2, wherein the first channel structure comprises a first groove, the first groove is formed on a first outer surface of the first bottom, the inner opening is exposed on a first inner surface of the first bottom and is connected to the first groove, the first outer surface faces the second bottom, and the first channel structure is connected to the second channel structure through the first groove.

4. The speaker back cover according to claim 3, wherein the first groove extends around the rotation axis.

5. The speaker back cover according to claim 2, wherein the second channel structure comprises a second groove, the second groove is formed on a second inner surface of the second bottom, the outer opening is exposed on a second outer surface of the second bottom and is connected to the second groove, the second inner surface faces the first bottom, and the second channel structure is connected to the first channel structure through the second groove.

6. The speaker back cover according to claim 5, wherein the second groove extends around the rotation axis.

7. The speaker back cover according to claim 2, wherein the first channel structure comprises a first groove, the first groove is formed on a first outer surface of the first bottom, the inner opening is exposed on a first inner surface of the first bottom and is connected to the first groove, the second channel structure comprises a second groove, the second groove is formed on a second inner surface of the second bottom, the outer opening is exposed on a second outer surface of the second bottom and is connected to the second groove, the first outer surface faces the second inner surface, and the first channel structure and the second channel structure are connected by overlapping the first groove and the second groove in a direction parallel to the rotation axis.

8. The speaker back cover according to claim 7, wherein the first groove is a first arc-shaped groove extending around the rotation axis, and the second groove is a second arc-shaped groove extending around the rotation axis.

9. The speaker back cover according to claim 1, wherein the first housing part and the second housing part are relatively moved or rotated so that the first channel structure and the second channel structure are disconnected.

10. A speaker, comprising:

a speaker driver, the speaker driver having a basket at its rear side; and a speaker back cover, the speaker back cover being sealed and fixed to the basket and comprising:

a first casing part, the first casing part having a first channel structure, the first channel structure having an inner opening; and a second casing part, the second casing part having a second channel structure, the second channel structure having an outer opening, the first casing part and the second casing part being relatively movably connected and forming a resonance space at the rear side of the speaker driver, the inner opening being exposed in the resonance space, the outer opening being exposed on the speaker back cover, the first channel structure and the second channel structure being connected so that the resonance space communicates with an outside of the speaker back cover through the inner opening and the outer opening;

wherein the first casing part and the second casing part is moved or rotated relative to each other to adjust a channel path length from the inner opening to the outer opening.

11. The speaker according to claim 10, wherein the first casing part is an inner cylindrical container, the second casing part is an outer cylindrical container, the first casing part and the second casing part are stacked together, the first casing part is inside the second casing part, the first casing part forms the resonance space, the first channel structure is formed on a first bottom of the first casing part, the second channel structure is formed on a second bottom of the second casing part, and the second casing part is rotatable around a rotation axis relative to the first casing part.

12. The speaker according to claim 11, wherein the first channel structure comprises a first groove, the first groove is formed on a first outer surface of the first bottom, the inner opening is exposed on a first inner surface of the first bottom and is connected to the first groove, the first outer surface faces the second bottom, and the first channel structure is connected to the second channel structure through the first groove.

13. The speaker according to claim 12, wherein the first groove extends around the rotation axis.

14. The speaker according to claim 11, wherein the second channel structure comprises a second groove, the second groove is formed on a second inner surface of the second bottom, the outer opening is exposed on a second outer surface of the second bottom and is connected to the second groove, the second inner surface faces the first bottom, and the second channel structure is connected to the first channel structure through the second groove.

15. The speaker according to claim 14, wherein the second groove extends around the rotation axis.

16. The speaker according to claim 11, wherein the first channel structure comprises a first groove, the first groove is formed on a first outer surface of the first bottom, the inner opening is exposed on a first inner surface of the first bottom and is connected to the first groove, the second channel structure comprises a second groove, the second groove is formed on a second inner surface of the second bottom, the outer opening is exposed on a second outer surface of the second bottom and is connected to the second groove, the first outer surface faces the second inner surface, and the first channel structure and the second channel structure are connected by overlapping the first groove and the second groove in a direction parallel to the rotation axis.

17. The speaker according to claim 16, wherein the first groove is a first arc-shaped groove extending around the rotation axis, and the second groove is a second arc-shaped groove extending around the rotation axis.

18. The speaker according to claim 10, wherein the first housing part and the second housing part are relatively moved or rotated so that the first channel structure and the second channel structure are disconnected.

* * * * *